Patented Feb. 12, 1952

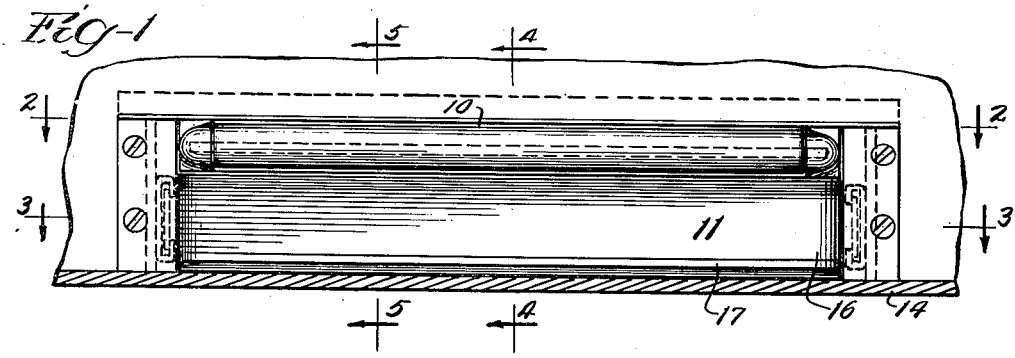
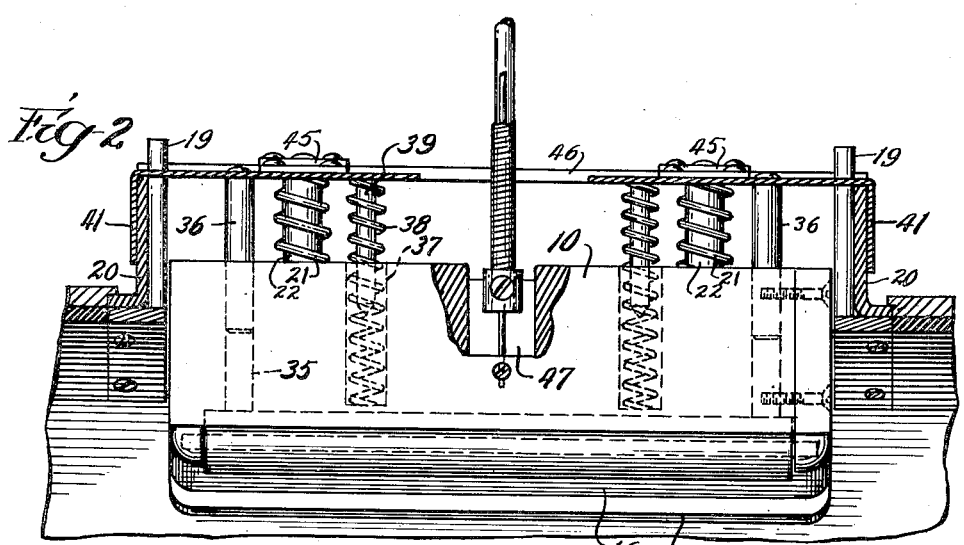
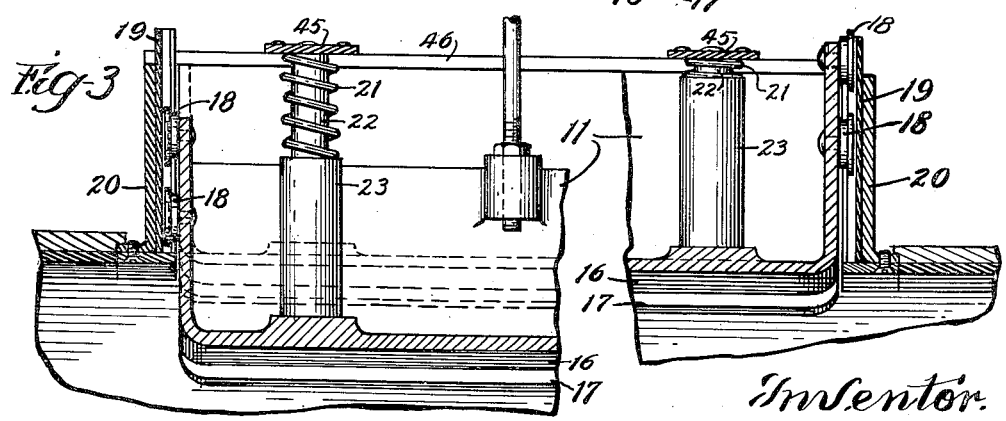

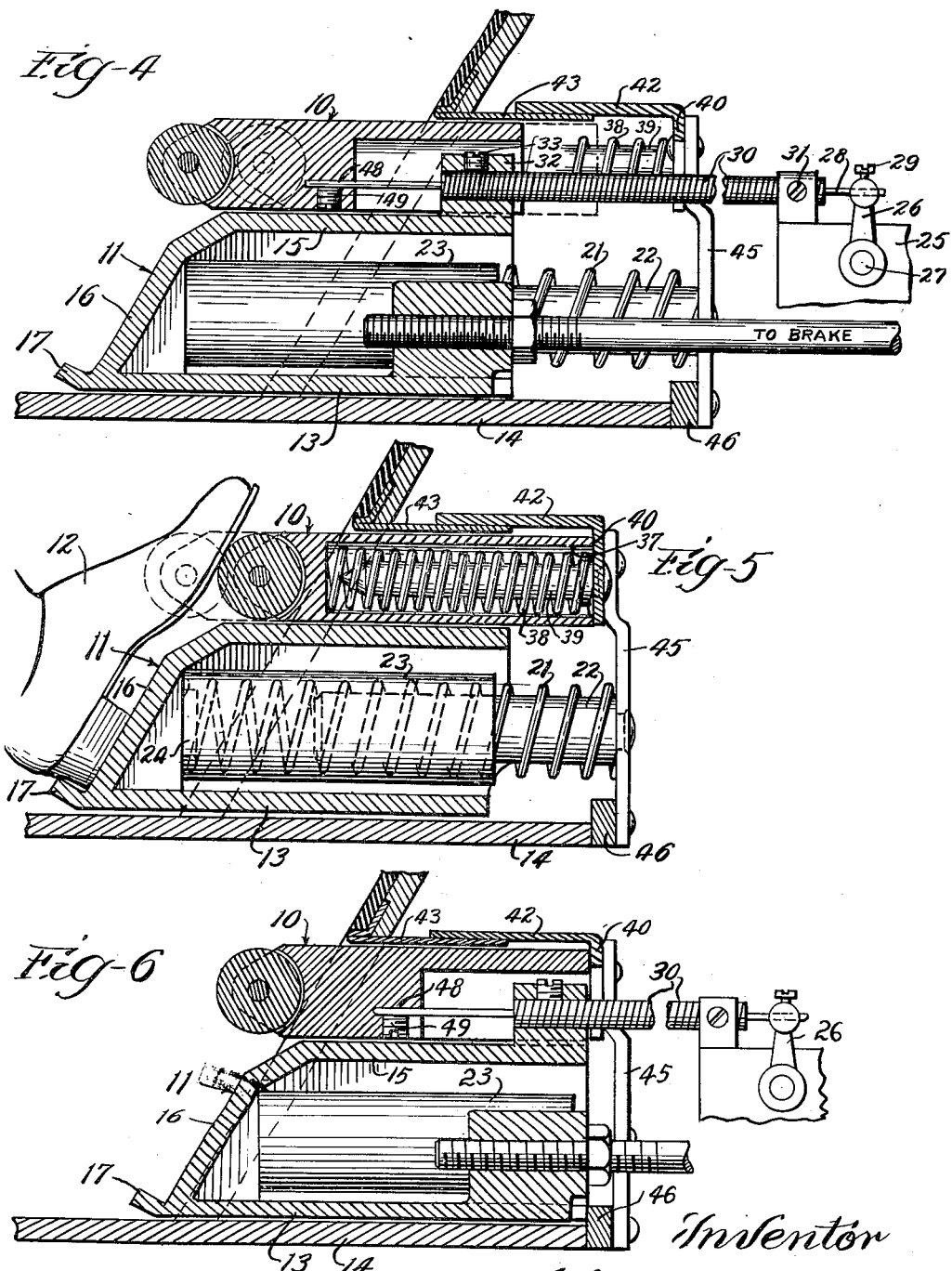

2,585,474

UNITED STATES PATENT OFFICE 2,585,474

THROTTLE AND BRAKE CONTROL

John K. Kramar, Morton Grove, Ill.

Application October 15, 1947, Serial No. 779,977

6 Claims. (Cl. 192—3)

The principal object of this invention is to provide brake control and throttle control members operable by a forward motion with the same foot, the throttle control being effective when the brake control is in released position, and being ineffective when the brake control member is moved to effective position, whereby the operator need only continue or increase the foot movement used to open the throttle in order to close it and apply the brakes, thus saving an increment of time that is often critical.

The preferred embodiment of the invention is shown in the accompanying drawings in which Fig. 1 is an elevation of the apparatus and a portion of the dash of an automobile;

Fig. 2 is a plan section taken on a line 2—2 of Fig. 1;

Fig. 3 is a plan section on a line 3—3 of Fig. 1, but broken away in order to show the parts in one position at the right and in another position at the left;

Figs. 4 and 5 are vertical sections taken on the lines 4—4 and 5—5 respectively of Fig. 1, and Fig. 6 is a vertical section similar to Fig. 4 with the parts shown in brake applying position.

But these drawings and the corresponding description are used for the purpose of disclosure only and are merely illustrative of the invention.

The throttle control member 10 and the brake control member 11 are shown as elongated or bar-like parts arranged one above the other crosswise to the car, and presenting operative faces to a foot 12 shown in Fig. 5.

The brake control member is hollow, whereby it resolves itself into a bottom portion 13 just above the floor boards 14, and a top portion 15 connected by an inclined rear wall 16 having a heel plate 17.

The brake control member is mounted on antifriction rollers 18, traveling in C-shaped track members 19 secured to forwardly extending brackets 20. It is yieldingly held and normally urged rearwardly by stout springs 21 surrounding guide pins 22 and in turn surrounded by sleeves 23 secured to projections 24 on the front side of the inclined rear wall 16. The pins 22 and the sleeves 23, together with the springs 21, form guides in addition to the anti-friction rollers 18 and the C-shaped guides 19, and serve to restrain any tendency to skew under the pressure of the operator's foot.

The carburetor of an internal combustion engine is generally indicated at 25 in Fig. 4, equipped with a lever 26 operating a butterfly valve (not shown) on a shaft 27. The lever 26 is operated by a Bowden wire, including the familiar spring steel wire 28 made fast to the lever 26 by a screw 29 and freely movable in the flexible tube 30, having its forward end made fast to the carburetor by a screw 31 and its rearward end made fast to the lug 32 on the top plate 15 of the brake control member by a screw 33.

The throttle control member is a generally solid bar overlying the brake control member, and movable along it or in unison with it forward and back to open and close the throttle. Near each end it has a transverse bore 35 receiving a guide pin 36, and inwardly from the bores 35, it has other bores 37 receiving springs 38 and other pins 39 whereby it is guided in its forward and backward movements and normally held, and always yieldingly urged to a rearward position by the springs 38.

The pins 36 and 39 are shown as riveted to the vertical flange 40 of an L-shaped transverse member having its ends turned rearwardly at 41, Fig. 2, and secured to the brackets 20. The horizontal flange 42 of that transverse member is secured to a transverse fitting 43, which, in turn, is secured to the front side of the dash.

The pins 22 are shown riveted to another transverse member 45 which overlies the vertical flange 40 and is secured to it. At its lower edge it is secured to a crosswise bar 46 secured to the floor boards 14.

The throttle control member, adjacent to its mid-portion, is provided with a slot or notch 47 to clear the lug 32 and provide a passage for the Bowden wire 28, the rear end of which extends into an opening 48 in the throttle control member and is there made fast by a screw 49.

Fig. 4 shows the normal inoperative position of the parts in solid lines, and in dotted lines it shows the forward position of the throttle control member to which it may move under the pressure of the foot. Somewhere between these positions is the normal operating range in driving, the full open throttle condition being indicated by the dotted line position of member 10 in Fig. 5.

Fig. 5 shows the position the parts assume when the foot is moved forward, taking the brake control member and the throttle control member together to a position in which the latter comes against the vertical flange 40 of the angular cross member, which thereby forms a limit stop for it. Further pressure of the foot advances the brake control bar only, taking with it the tube 30 of the Bowden wire, thereby in effect moving the tube forwardly over the wire which amounts to a relative rearward motion of the Bowden wire in said tube, and thereby closing the throttle, in the meantime, taking up the slack and applying the brakes. Accordingly, it will be apparent that the lug 32 of the brake control member 11 cooperates with the flexible tube 30 as a means for releasing the throttle when the brakes are applied.

Fig. 6 shows the position of the parts with the brakes applied.

The brake control member and the throttle control member may be of considerable length, approximating half the width of the dash, thereby accommodating both feet of the operator, in which case either foot may be used for operating the throttle or brake or both may be used simultaneously. In any case, all the operator has to do in an emergency requiring brake application is to execute the instinctive push with either or both feet. This arrangement is particularly suitable for cars equipped with what is commonly known as "fluid drive."

Applications of the invention to cars having the familiar clutch and clutch pedal at the left will make the brake control and throttle control members appropriately shorter. However, they may still be long enough to accommodate two feet.

It will be seen from the above description that the invention provides a combined throttle and brake control arrangement in which closing of the throttle is accomplished automatically and without conscious thought on the part of the operator, in response to a natural forward movement of the brake control bar, which from the point of view of motoring safety is a distinct improvement over arrangements which require a bodily movement of the foot from one pedal to another. Moreover, the use of reciprocating control bars moving substantially parallel to the floor boards of the car, as contrasted with oscillating pedals or similar controls of the prior art, represents a considerable increase in the comfort of the operator, since the foot or feet may always be maintained in a comfortable angular relation to the legs.

I claim:

1. In a device of the class described, an elongated reciprocating brake control member movable sidewise to apply and release brakes, guides at each end of the member, spring means normally holding said member in brake released position, a Bowden wire for operating the throttle in a tube having one end fast to the brake control member, an elongated reciprocating throttle control member fast to the Bowden wire and movable both relative to and in unison with said brake control member, resilient means normally holding said throttle control member in closed position, and means to limit the movement of the throttle control member in unison with the brake control member, whereby said brake control member may be moved further independently of said throttle control member to drive the tube forwardly along said Bowden wire and away from said throttle control member.

2. In a device of the class described, a reciprocating brake control member mounted for to-and-fro sliding movement, means yieldingly urging said member in one direction to brake-released position, throttle operating means including a control cable comprising a wire slidable in a flexible tubular casing, said casing having one end fast to the brake control member, a reciprocating throttle control member mounted adjacent said brake control member and movable both relative to and in unison with the brake control member substantially parallel to the path of the latter, said throttle control member being secured to the wire of said cable, means yieldingly urging said throttle control member to throttle-closed position in said direction, and a fixed stop for limiting travel of said throttle control member in the opposite direction to an amount less than the possible travel of said brake control member.

3. In a device of the class described, a reciprocating brake control member mounted for to-and-fro slidable movement in a right line to apply and release brakes, yielding means normally holding said member in brake-released position, throttle operating means including a control cable comprising a wire slidable in a flexible tubular casing, said casing having one end fast to the brake control member for movement therewith, a reciprocating throttle control member mounted adjacent and over said brake control member and movable both relative to and in unison with the brake control member in a path substantially parallel to the movement thereof, said throttle control member being fast to the wire of said cable to move it to open and close a throttle, and means for limiting the operating travel of said throttle control member to a smaller value than the maximum travel of said brake control member.

4. In a device of the class described, a reciprocating brake control member mounted for to-and-fro slidable movement in a right line to apply and release brakes, yielding means normally holding said member in brake-released position, throttle operating means including a control cable comprising a wire slidable in a flexible tubular casing, said casing having one end fast to the brake control member for movement therewith, a reciprocating throttle control member adjacent said brake control member and fast to the wire of said control cable and movable over the brake control member in parallel relation thereto to adjust the throttle, and a forward stop for the throttle control member arranged to limit the movement thereof to a smaller amount than the maximum possible movement of said brake control member.

5. In a device of the class described, a reciprocating brake control member mounted for to-and-fro slidable movement, means yieldingly urging said member to brake-released position, throttle operating means including a control cable comprising a wire slidable in a flexible tubular casing, said casing having one end fast to said brake control member, a reciprocating throttle control member mounted for to-and-fro movement in a plane adjacent and parallel to the path of movement of said brake control member, for operating a throttle, said throttle control member being secured to the wire of said cable, means yieldingly urging said throttle control member to throttle-closed position, and means for stopping the movement of the throttle control member short of the maximum possible movement of said brake control member, said members being arranged for movement in their parallel planes in response to pressure applied by the foot of an operator.

6. In a device of the class described, a combined throttle and brake control for vehicles of the type having a floor board and throttle and brake control elements positioned forwardly of the driver adjacent the floor board, comprising a brake control bar movable forwardly of the driver to apply the brakes, means normally biasing said brake control bar to a non-operative position, a throttle control bar mounted above the brake control bar in close proximity thereto and movable forwardly substantially parallel to the direction of movement of said brake control bar independently of the brake control bar to control the throttle, means normally biasing said throttle control bar to non-operative position, a fixed stop for limiting forward travel of said throttle control bar to an amount less than the possible forward travel of said brake control bar, throttle operating means connected to said throttle control bar to control the throttle, and throttle release means carried by said brake control bar and engageable with said throttle operating means to release the throttle when said brake control member is moved forwardly relative to said throttle control member after forward movement of said throttle control member has been stopped due to engagement with said fixed stop.

JOHN K. KRAMAR.

REFERENCES CITED

The following references are of record in the file of this patent:

UNITED STATES PATENTS

| Number | Name | Date |
|---|---|---|
| D. 138,320 | Johnston | July 18, 1944 |
| 1,642,038 | Louth | Sept. 13, 1927 |
| 1,801,174 | Porsche | Apr. 14, 1931 |
| 1,902,667 | Sanders | Mar. 21, 1933 |
| 1,928,267 | Rudyk | Sept. 26, 1933 |
| 2,002,511 | Sanford | May 28, 1935 |
| 2,020,440 | Stein | Nov. 12, 1935 |
| 2,087,205 | Polete | July 13, 1937 |
| 2,280,859 | Siesennop | Apr. 28, 1942 |
| 2,175,445 | Ramussen | Oct. 10, 1939 |

FOREIGN PATENTS

| Number | Country | Date |
|---|---|---|
| 485,901 | Great Britain | Aug. 26, 1937 |